(12) United States Patent
Shiozawa (10) Patent No.: US 8,228,780 B2
(45) Date of Patent: Jul. 24, 2012

(54) OPTICAL DISK DEVICE

(75) Inventor: Manabu Shiozawa, Yokohama (JP)

(73) Assignees: Hitachi-LG Data Storage, Inc., Tokyo (JP); Hitachi Consumer Electronics Co., Ltd., Tokyo (JP)

( * ) Notice: Subject to any disclaimer, the term of this patent is extended or adjusted under 35 U.S.C. 154(b) by 0 days.

(21) Appl. No.: 12/940,561

(22) Filed: Nov. 5, 2010

(65) Prior Publication Data

US 2011/0110206 A1 May 12, 2011

(30) Foreign Application Priority Data

Nov. 6, 2009 (JP) ................................. 2009-254682

(51) Int. Cl.
*G11B 7/00* (2006.01)
(52) U.S. Cl. ..................................... 369/116; 369/53.26
(58) Field of Classification Search .................. 369/116, 369/53.26, 47.5–47.53, 44.32, 53.27, 59.11
See application file for complete search history.

(56) References Cited

U.S. PATENT DOCUMENTS

| | | | | |
|---|---|---|---|---|
| 5,175,722 A | * | 12/1992 | Minami et al. ................ | 369/116 |
| 5,781,222 A | * | 7/1998 | Yamawaki et al. ............ | 347/236 |
| 6,421,314 B1 | * | 7/2002 | Maruyama ..................... | 369/116 |
| 2002/0176461 A1 | * | 11/2002 | Nihei et al. ................. | 372/38.02 |
| 2004/0223438 A1 | * | 11/2004 | Kura et al. .................. | 369/53.26 |
| 2008/0253238 A1 | * | 10/2008 | Kaku et al. .................. | 369/44.11 |

FOREIGN PATENT DOCUMENTS

| | | | |
|---|---|---|---|
| JP | 2007-172770 | | 7/2007 |
| JP | 2007172770 A | * | 7/2007 |
| JP | 2009-140580 | | 6/2009 |

* cited by examiner

*Primary Examiner* — Thang Tran
(74) *Attorney, Agent, or Firm* — McDermott Will & Emery LLP

(57) ABSTRACT

Proposed is an optical disk device capable of optimally adjusting a current value of a direct current and a high frequency superimposed current for driving a laser diode. This optical disk device includes a laser driver for superimposing a high frequency current on a direct current to obtain a drive current and supplying the drive current to the laser beam source and driving the laser beam source, and a control unit for adjusting a current value of the direct current and/or the high frequency superimposed current supplied by the laser driver to the laser beam source based on the servo signal or the reproduction signal. The control unit adjusts the current value of the direct current and/or the high frequency superimposed current so that a value representing a waveform fluctuation of the servo signal or the reproduction signal satisfies a specified value of the waveform fluctuation, a value representing a reproduction performance of the reproduction signal satisfies a specified value of the reproduction performance, and a value representing a durability performance of the optical disk in relation to the laser beam satisfies a specified value of the durability performance.

9 Claims, 11 Drawing Sheets

OPTICAL DISK DEVICE

CROSS REFERENCES

This application relates to and claims priority from Japanese Patent Application No. 2009-254682, filed on Nov. 6, 2009, the entire disclosure of which is incorporated herein by reference.

BACKGROUND

The present invention relates to an optical disk device for reproducing an optical disk, and, for example, can be suitably applied to an optical disk device capable of reproducing an optical disk comprising a plurality of recording layers.

In recent years, with optical disks of the BD (Blu-ray Disc) specification, technology for increasing the number of recording layers for increasing the recording capacity has been proposed, and an optical disk with two recording layers has been put into practical use. In order to achieve even greater capacity, it is anticipated that a multilayered optical disk with three or even four or more recording layers (hereinafter referred to as a "multilayered disk") will be put into practical use.

Nevertheless, in the reproduction of a multilayered disk, deterioration in the reproduction quality easily occurs due to the deterioration in the reflectance of the recording layer. Thus, this problem is resolved by increasing the direct current and the high frequency superimposed current supplied to the laser diode for emitting a laser beam to the optical disk in order to obtain a favorable S/N ratio.

Meanwhile, in the case of a recordable optical disk, if the direct current and the high frequency superimposed current supplied to the laser diode are simply increased, it will not be possible to ensure so-called reproduction durability.

In response to the foregoing problem, Japanese Unexamined Patent Application Publication No. 2009-140580 discloses technology for setting optical read power in an optical disk device by gradually increasing the read power, measuring an index value representing the quality of the reproduction signal upon reproducing the optical disk at the respective read powers, and referring to the lower limit read power in which the measured index value becomes a minimum value.

Moreover, Japanese Unexamined Patent Application Publication No. 2007-172770 discloses technology in which, in an optical disk device, a jitter detector reproduces the recorded information and detects it as a reproduction signal, and a controller sets the superimposition level of the high frequency current according to the reproduction signal that was detected with the jitter detector.

SUMMARY

Nevertheless, in the reproduction of a multilayered disk with the optical disk devices employing the foregoing technologies, there is a problem in that the servo signal or the reproduction signal will fluctuate due to the influence of the reflected light from a layer other than the layer to be recorded or reproduced. As a result of these signals fluctuating, the reproduction quality will deteriorate. Thus, it is necessary to adjust the current value of the direct current and the high frequency superimposed current for driving the laser diode so as not to be influenced by the reflected light from a layer other than the layer to be recorded or reproduced.

The present invention was devised in view of the foregoing points. Thus, an object of this invention is to propose an optical disk device capable of optimally adjusting the current value of the direct current and the high frequency superimposed current for driving a laser diode.

In order to achieve the foregoing object, one mode of the present invention provides an optical disk device which reflects a laser beam emitted from a laser beam source off an optical disk, detects the reflected light as an electric signal with a photodiode, and generates a servo signal or a reproduction signal from the detected electric signal. This optical disk device comprises a laser driver for superimposing a high frequency current on a direct current to obtain a drive current and supplying the drive current to the laser beam source and driving the laser beam source, and a control unit for adjusting a current value of the direct current and/or the high frequency superimposed current supplied by the laser driver to the laser beam source based on the servo signal or the reproduction signal. The control unit adjusts the current value of the direct current and/or the high frequency superimposed current so that a value representing a waveform fluctuation of the servo signal or the reproduction signal satisfies a specified value of the waveform fluctuation, a value representing a reproduction performance of the reproduction signal satisfies a specified value of the reproduction performance, and a value representing a durability performance of the optical disk in relation to the laser beam satisfies a specified value of the durability performance.

According to the present invention, it is possible to realize an optical disk device capable of optimally adjusting the current value of the direct current and the high frequency superimposed current for driving a laser diode.

DETAILED DESCRIPTION

An embodiment of this invention is now explained in detail with reference to the attached drawings.

(1) Configuration of Optical Disk Device in Present Embodiment

Figure 1:
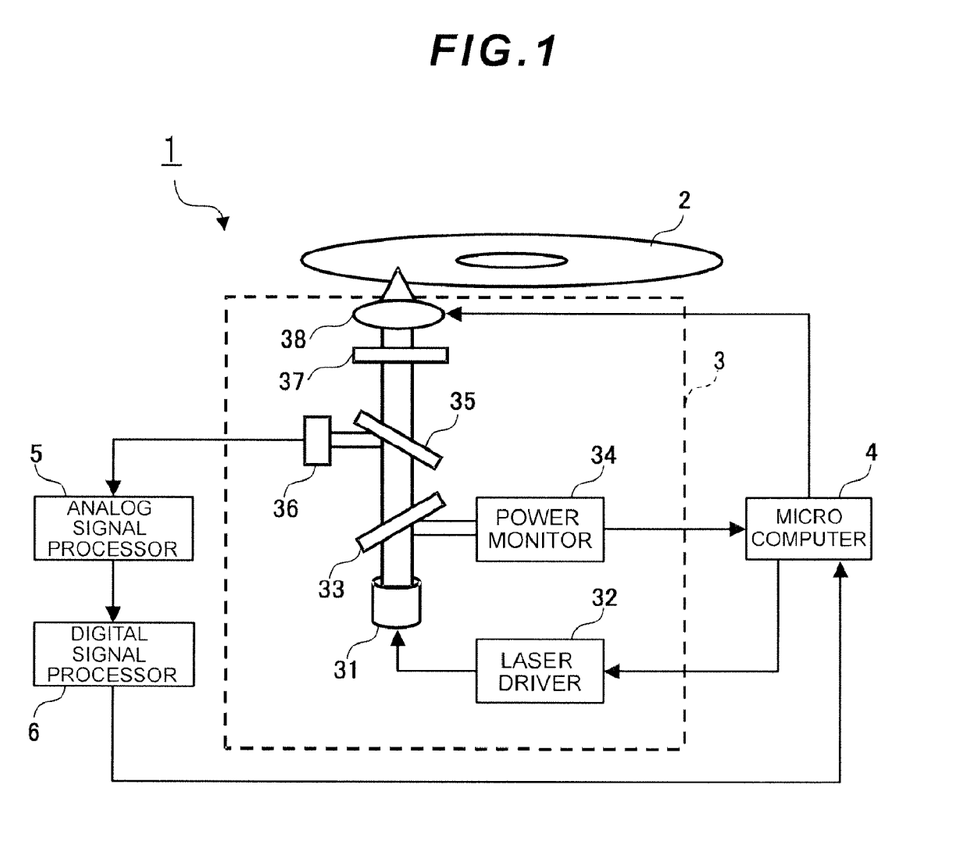
FIG. 1 is a block diagram showing the optical disk device according to an embodiment of the present invention.

FIG. 1 shows the overall optical disk device 1 according to this embodiment. The optical disk device 1 comprises an optical pickup 3, a microcomputer 4, an analog signal processor 5, and a digital signal processor 6, and is configured to be loaded with an optical disk 2.

The optical pickup 3 irradiates a laser beam on the optical disk 2, detects the reflected light and converts it into an electric signal based on photoelectric conversion, and supplies this to the analog signal processor 5. Moreover, the optical pickup 3 comprises a laser diode 31, a laser driver 32, a beam splitter 33, a power monitor 34, a polarizing beam splitter 35, a detector 36, a quarter wavelength plate 37, and an objective lens 38.

The laser diode 31 emits a laser beam with the emission power according to the drive current supplied from the laser driver 32.

The laser driver 32 comprises a direct current circuit and a high frequency current circuit not shown. The laser driver 32, in accordance with the control of the microcomputer 4, superimposes a high frequency current caused to be output from the high frequency current circuit on a direct current caused to be output from the direct current circuit and supplies this to the laser diode 31, and thereby drives the laser diode 31.

Figure 2:
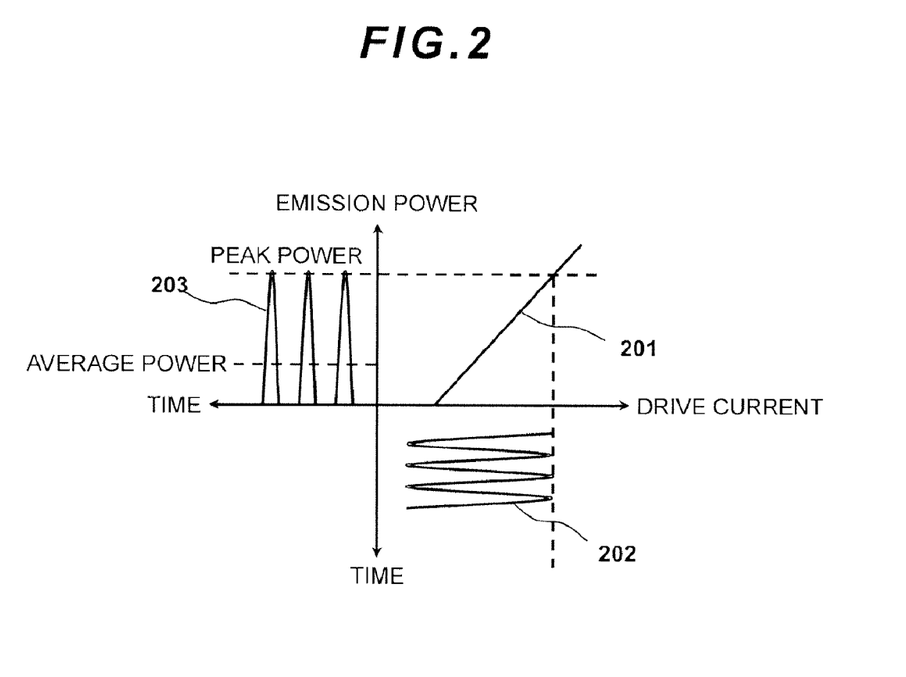
FIG. 2 is a diagram showing the relation of the drive current and emission waveform of the laser diode.

Here, the relation of the emission power of the laser beam emitted from the laser diode 31 and the drive current supplied by the laser driver 32 to the laser diode 31 is explained with reference to FIG. 2.

The relation of the current value of the drive current supplied to the laser diode 31 and the emission power of the laser beam emitted from the laser diode 31 is of the proportional relation shown with the line 201. This characteristic will differ depending on the laser diode. Moreover, the laser driver 32 supplies a drive current in the form of a sine wave 202 to the laser diode 31. With the drive current, a high frequency current is superimposed on a direct current. When the drive current shown with the sine wave 202 is supplied to the laser diode 31 having the characteristics shown with the line 201, the laser diode 31 outputs a laser beam in which the emission power becomes the emission waveform shown with the waveform 203.

In other words, the emission waveform can be controlled by changing the direct current component and the high frequency component contained in the drive current that is output from the laser driver 32. Here, the ratio of the peak power of the emission waveform 203 in relation to the average power is defined as the "HF modulation factor." Moreover, the "read power" shall mean the average power shown in FIG. 2.

The beam splitter 33 causes a part of the laser beam from the laser diode 31 to be transmitted, and reflects a part of the laser beam and guides it to the power monitor 34.

The power monitor 34 is a photodiode for performing APC (Automatic Power Control) drive, detects the laser beam that is output from the laser diode 31 via the beam splitter 33, converts the detected laser beam into an electric signal based on photoelectric conversion, and outputs this to the microcomputer 4.

The polarizing beam splitter 35 causes the laser beam from the beam splitter 33 to be transmitted, and the quarter wavelength plate 37 changes the polarizing direction by shifting the phase of the laser beam from the polarizing beam splitter 35 $\pi/2$. The objective lens 38 collects the laser beams from the quarter wavelength plate 37 on the recording layers of the multilayered optical disk 2, and converts the laser beams that were reflected on the recording layers of the multilayered optical disk 2 into parallel light. The laser beam reflected off the optical disk 2 retains information written into the recording layers of the optical disk 2 as the change in light intensity.

The quarter wavelength plate 37 changes the polarizing direction of the laser beam from the objective lens 38, and the polarizing beam splitter 35 reflects the laser beam from the quarter wavelength plate 37 and collects it on the detector 36.

The detector 36 is configured from a multi-quadrant photodiode, detects the laser beam from the polarizing beam splitter 35, converts the detected laser beam into an electric signal based on photoelectric conversion, and outputs this to the analog signal processor 5.

The microcomputer 4 measures the waveform fluctuation of the servo signal, the reproduction performance of the reproduction signal and the reproduction durability of the optical disk 2, all described later, specifies the range in the HF modulation factor and the read power which satisfies the respective specified values thereof, determines the HF modulation factor and the read power to be used in the specified range, adjusts the current value of the direct current and/or the high frequency superimposed current so that it becomes the determined read power and HF modulation factor, and thereby starts the reproduction of the optical disk 2. The microcomputer 4 thereafter causes the laser diode 31 to irradiate a laser beam while performing the APC drive so as to maintain the determined read power based on the electric signal supplied from the power monitor 34. Moreover, the microcomputer 4 performs feedback control to the actuator (not shown) for driving the objective lens based on the servo signal supplied from the digital signal processor 6. Moreover, the microcomputer 4 comprises an interface of the ATAPI (AT Attachment Packet Interface) standard or the like not shown, and communicates with a host apparatus such as a personal computer via the interface.

The analog signal processor 5 generates a reproduction signal based on the electric signal supplied from the detector 36, performs processing of equalization, amplification or the like to the generated reproduction signal, and outputs this to the digital signal processor 6. The digital signal processor 6 performs signal processing such as analog/digital conversion, equalization, decoding or the like to the reproduction signal supplied from the analog signal processor 5, and additionally measures the jitter of the reproduction signal or the error rate of the decoded data. The decoded data, jitter of the reproduction signal and error rate of data are output to the microcomputer 4.

Moreover, the analog signal processor 5 generates servo signals such as a focus error signal, a tracking error signal (hereinafter referred to as the "TE signal") and a wobble signal based on the electric signal supplied from the detector 36, and outputs this to the digital signal processor 6. The digital signal processor 6 measures the jitter and the like of the servo signal supplied from the analog signal processor 5. Moreover, the servo signal and the jitter of the servo signal are output to the microcomputer 4.

(2) Problems of Conventional Optical Disk Device

Figure 3:
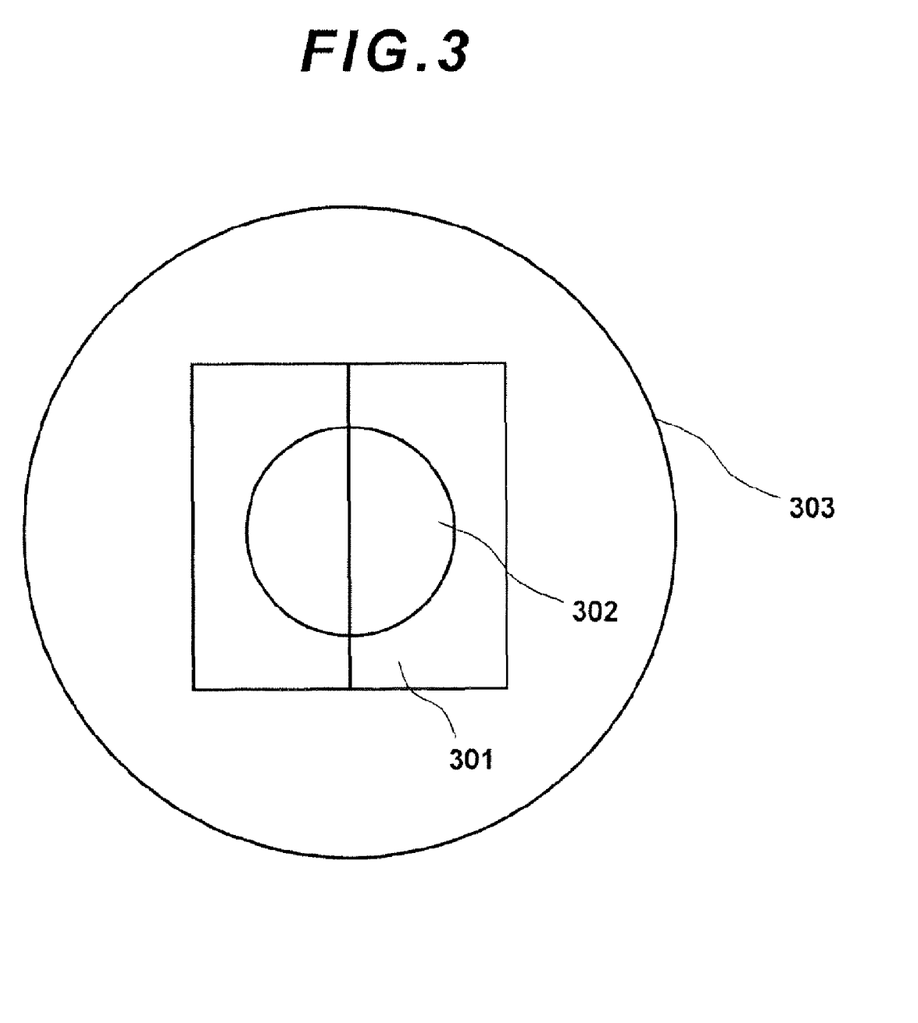
FIG. 3 is a diagram explaining the state of the reflected light from the optical disk being projected on the detector.

Foremost, the state where the reflected light of the optical disk 2 is collected in the detector 36 is explained with reference to FIG. 3. The detector 36 is configured from two or more photodiodes 301. When the reflected light from the recording layer of the optical disk 2 to be reproduced is projected on the photodiode 301 as a spot 302, the detector 36 outputs an electric signal according to the structure or recorded state of the recording layer of the optical disk 2. Nevertheless, when recording or reproducing a multilayered disk, the reflected light from a recording layer other than the recording layer to be reproduced is also projected on the photodiode 301 as a spot 303.

Figure 4A:
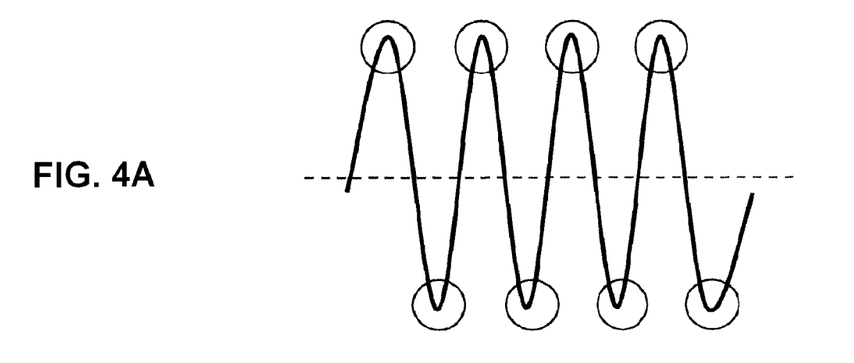
FIG. 4A is a waveform diagram of a tracking error signal in a single layer disk.
Figure 4B:
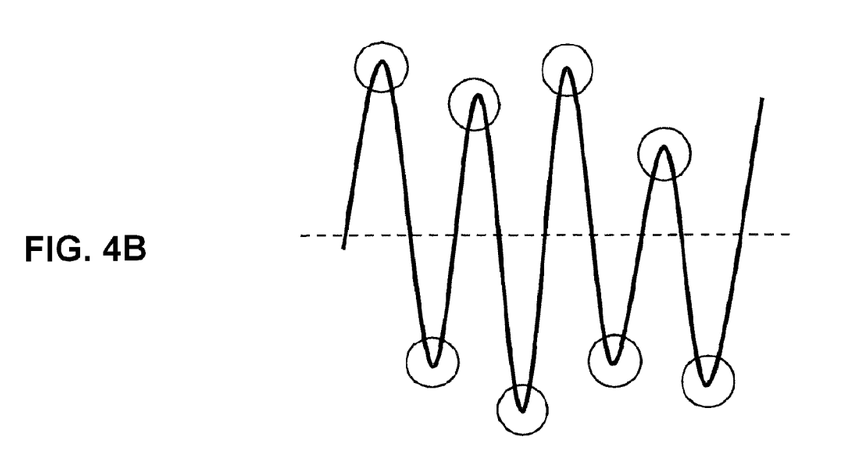
FIG. 4B is a waveform diagram of a tracking signal in a multilayered disk.

Consequently, as shown in FIG. 4A, although the local maximum value and the local minimum value in the TE signal are approximately constant throughout the entire time with a single layer disk, with a multilayered disk, as shown in FIG. 4B, the local maximum value and the local minimum value in the TE signal will fluctuate. This is because the reflected from the target layer and the reflected light from another layer interfere with each other in the detector 36. When this kind of waveform fluctuation occurs, it is not possible to perform tracking normally, and this will aggravate the recording/reproduction performance.

(3) Outline of Operation of Optical Disk Device in Present Embodiment

The operation of the optical disk device 1 is now briefly explained with reference to FIG. 5 to FIG. 8.

Figure 5:
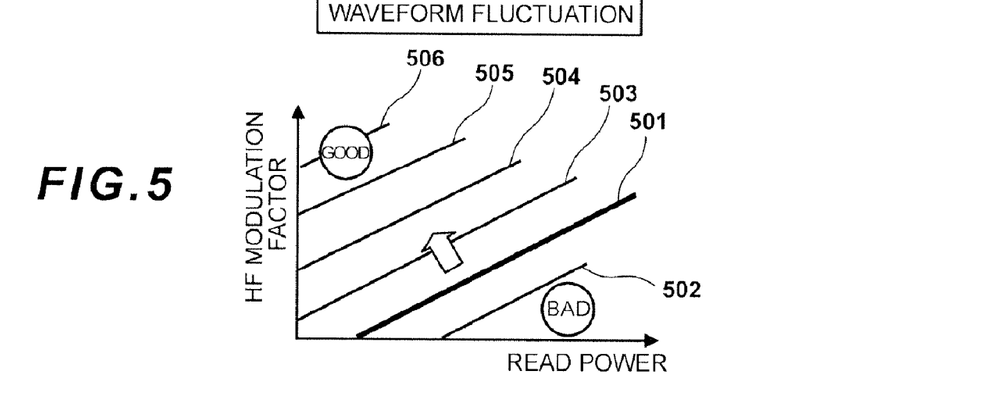
FIG. 5 is a diagram showing a waveform fluctuation of the TE signal in relation to the read power and the HF modulation factor.

When the optical disk 2 is loaded, the optical disk device 1 measures the waveform fluctuation of the TE signal for each HF modulation factor of a predetermined step size and for each read power of a predetermined step size, and creates a two-dimensional map showing the waveform fluctuation of the TE signal in relation to the read power and the HF modulation factor as shown in FIG. 5. The waveform fluctuation of the TE signal is represented, for example, with the standard deviation of the respective local maximum values of the TE signal, the standard deviation of the respective local minimum values of the TE signal, or the standard deviation of the respective cents of amplitude of the TE signal. Here, the line 501 is a line in which the waveform fluctuation of the TE signal takes on a specified value (for example, standard deviation "A"), the line 502 is a line in which the waveform fluctuation takes on a value that does not satisfy the specified value (for example, standard deviation "A+α"), and lines 503 to 506 are lines in which the waveform fluctuation takes on a value that satisfies the specified value (for example, standard deviation "A−α", "A−2α", "A−3α" "A−4α"). In other words, if the HF modulation factor is increased, it is possible to inhibit the interference of the reflected light from the target layer and the reflected light from another layer, and thereby inhibit the waveform fluctuation. Moreover, the waveform fluctuation is also dependent on the read power. Here, if a laser beam is output with the HF modulation factor and the read power closer to the lines 503 to 506 than the line 501, the waveform fluctuation of the TE signal is able to satisfy the specified value.

Figure 6:
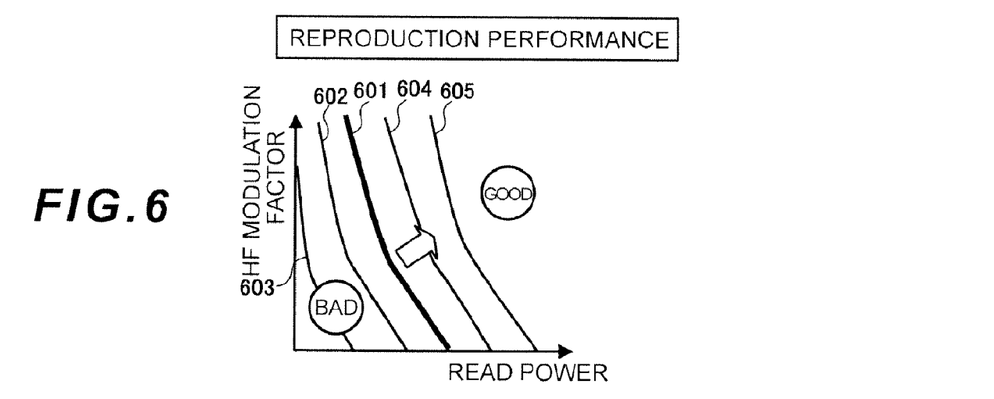
FIG. 6 is a diagram showing the reproduction performance of the reproduction signal in relation to the read power and the HF modulation factor.

Subsequently, the optical disk device 1 measures the reproduction performance of the reproduction signal for each HF modulation factor of a predetermined step size and for each read power of a predetermined step size, and creates a two-dimensional map showing the reproduction performance of the reproduction signal in relation to the read power and the HF modulation factor as shown in FIG. 6. The reproduction performance of the reproduction signal is represented, for example, as the jitter or error rate of the reproduction signal. Here, the line 601 is a line in which the reproduction performance of the reproduction signal takes on a specified value (for example, jitter B[%]), lines 602 and 603 are lines in which the reproduction performance take on a value that does not satisfy a specified value (for example, jitter B+β[%], B+2β[%]), and lines 604 and 605 are lines in which the reproduction performance takes on a value that satisfies a specified value (for example, jitter B−β[%], B−2β[%]). In other words, if the HF modulation factor is increased, it is possible to reduce the laser noise and improve the reproduction performance by inhibiting the contribution of the return light. Moreover, if the read power is increased, it is possible to increase the signal amplitude and improve the reproduction performance. Here, if a laser beam is output with the HF modulation factor and the read power closer to the lines 604, 605 than the line 601, the reproduction performance of the reproduction signal is able to satisfy the specified value.

Figure 7:
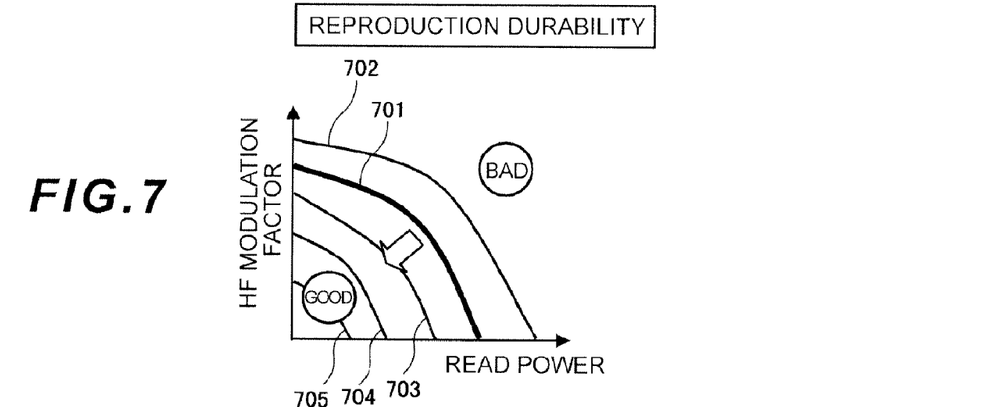
FIG. 7 is a diagram showing the reproduction durability of the optical disk in relation to the read power and the HF modulation factor.

The optical disk device 1 thereafter measures the reproduction durability of the optical disk 2 for each HF modulation factor of a predetermined step size and for each read power of a predetermined step size, and creates a two-dimensional map showing the reproduction durability of the optical disk 2 in relation to the read power and the HF modulation factor as shown in FIG. 7. The reproduction durability is, for example, a deterioration value of the reproduction performance of the reproduction signal after the optical disk 2 is reproduced a predetermined number of times in a predetermined recording area. Here, the line 701 is a line in which the reproduction durability takes on a specified value (for example, jitter deterioration value C[%]), the line 702 is a line in which the reproduction durability takes on a value that does not satisfy a specified value (for example, jitter deterioration value C+γ[%]), and lines 703 to 705 are lines in which the reproduction durability takes on a value that satisfies a specified value (for example, jitter deterioration value C−γ[%], C−2γ[%], C−3γ[%]). In other words, the reproduction durability decreases pursuant to the increase of the read power and the HF modulation factor. This is due to the increase in the heat quantity that is applied to the recording layer of the optical disk 2. Here, if a laser beam is output with the HF modulation factor and the read power closer to the lines 703 to 705 than the line 701, the reproduction durability of the optical disk 2 is able to satisfy the specified value.

Figure 8:
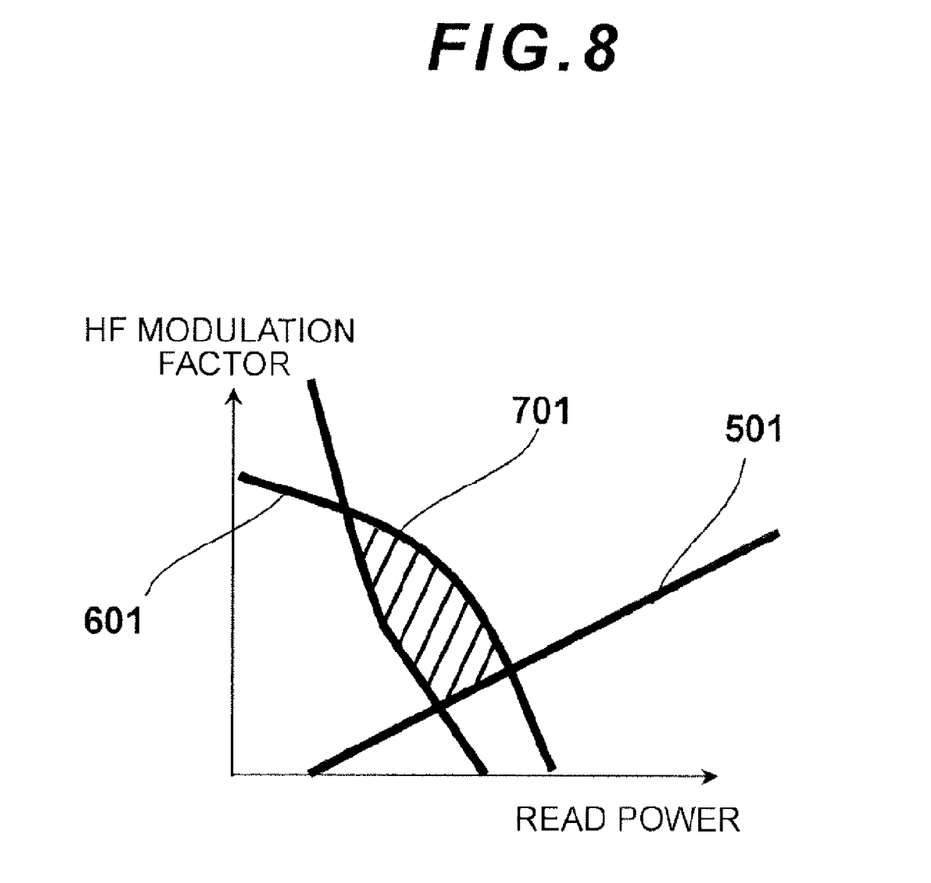
FIG. 8 is a diagram showing the range that the waveform fluctuation, the reproduction performance and the reproduction durability satisfy the respective specified values in relation to the read power and the HF modulation factor.

Subsequently, the optical disk device 1 specifies the range in which the waveform fluctuation of the TE signal, the reproduction performance of the reproduction signal and the reproduction durability of the optical disk 2 satisfy the respective specified values; that is, the range that is surrounded by the lines 501, 601, 701 as shown in FIG. 8, determines the read power and the HF modulation factor within the specified range, and performs the reproduction based on the determined HF modulation factor and the read power. If it is possible to take on values of a plurality of HF modulation factors or values of a plurality of read powers, for example, HF modulation factor and the read power are determined so that the power consumption becomes the smallest. Meanwhile, the reproduction is stopped if there is no range that satisfies the specified values.

As described above, the optical disk device 1 is able to perform the reproduction based on the optimal HF modulation factor and the read power in which the waveform fluctuation of the TE signal, the reproduction performance of the reproduction signal, and the reproduction durability of the optical disk 2 satisfy the respective specified values.

Figure 9:
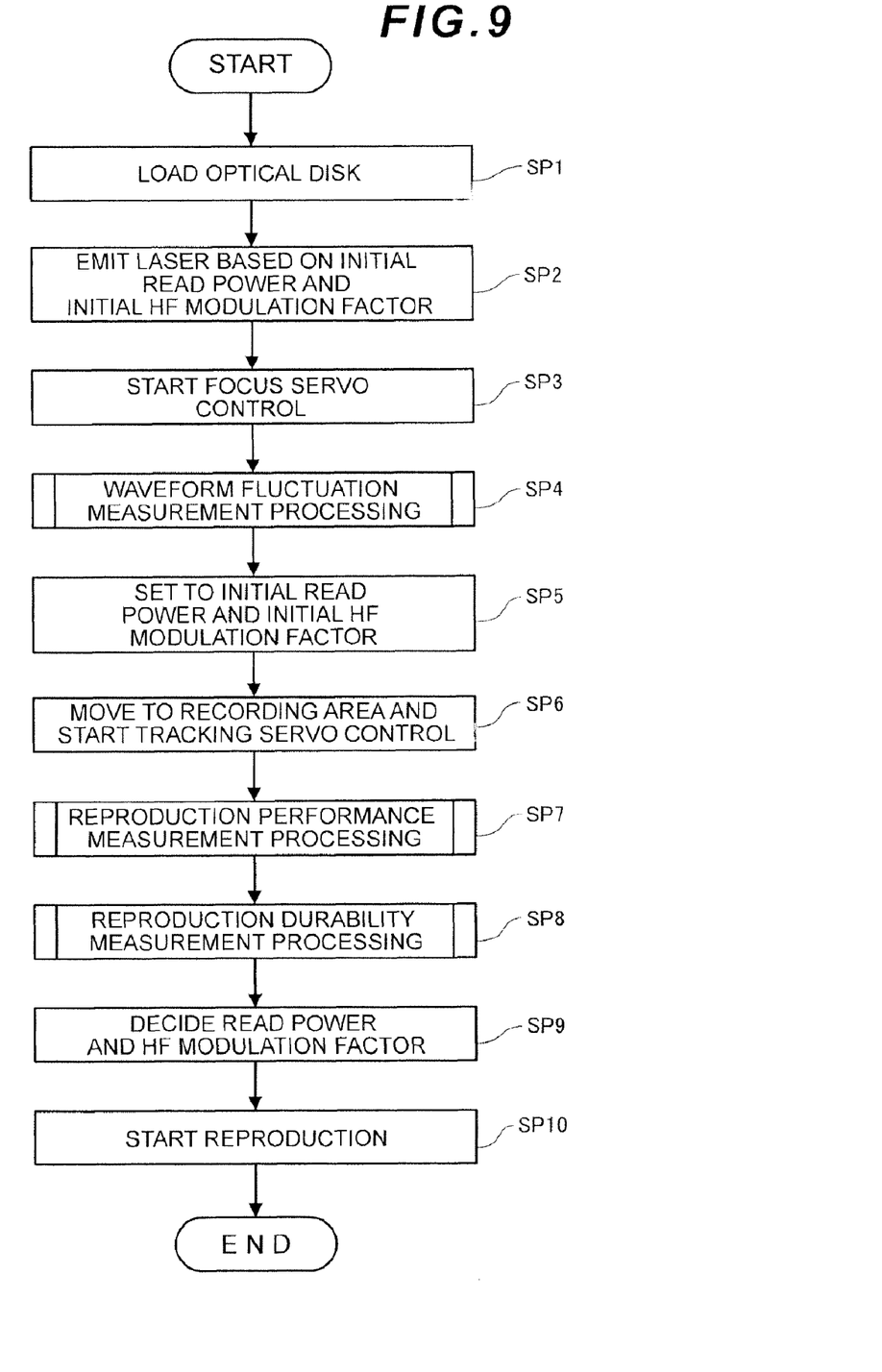
FIG. 9 is a flowchart explaining the determination processing of the read power and the HF modulation factor.

(4) Specific Processing in Optical Disk Device (4-1) Determination Processing of Read Power and HF Modulation Factor Here, the read power and HF modulation factor determination processing for the optical disk device 1 to determine the read power and the HF modulation factor is explained with reference to FIG. 9.

Foremost, if the microcomputer 4 detects that the optical disk 2 has been loaded in the optical disk device 1 (SP1), it causes the laser diode 31 to emit light based on the initial read power and the initial HF modulation factor (SP2).

Here, the initial read power may be a small value of a range in which the servo control of focusing and tracking is possible and the reproduction performance can be measured; for example, 1.0 mW with a multilayered disk, or the recommended read power that is recorded on the optical disk. The initial HF modulation factor may similarly be a small value;

for example, modulation factor 1. This means that light is emitted only with the direct current without superimposing a high frequency current. As a result of performing the reproduction under the foregoing conditions, the possibility that the information recorded on the optical disk will be destroyed can be inhibited.

Subsequently, the microcomputer 4 starts the focus servo control (SP3), and performs the waveform fluctuation measurement processing for obtaining a two-dimensional map of a waveform fluctuation in relation to the read power and the HF modulation factor as shown in FIG. 5 (SP4). Note that the waveform fluctuation measurement processing will be described later in detail.

The microcomputer 4 once again sets the reproduction conditions to the initial read power and the initial HF modulation factor (SP5), moves the objective lens 38 by driving an actuator not shown, thereby moves the spot position of the laser beam on the recording layer of the optical disk 2 to the recording area, and starts the tracking servo control (SP6).

The microcomputer 4 performs the reproduction performance measurement processing for obtaining a two-dimensional map of the reproduction performance in relation to the read power and the HF modulation factor as shown in FIG. 6 (SP7). Note that the reproduction performance measurement processing will be described later in detail.

The microcomputer 4 performs the reproduction durability measurement processing for obtaining a two-dimensional map of the reproduction durability in relation to the read power and the HF modulation factor as shown in FIG. 7 (SP8). Note that the reproduction durability measurement processing will be described later in detail.

The microcomputer 4 uses the two-dimensional maps obtained at steps SP4, SP7, SP8 and determines the read power and the HF modulation factor which satisfy the specified values of the waveform fluctuation, the reproduction performance, and the reproduction durability (SP9), adjusts the current value of the direct current and/or the high frequency superimposed current so that it becomes the determined read power and HF modulation factor, thereby starts the reproduction of the optical disk 2 (SP10), and then ends the processing.

(4-2) Waveform Fluctuation Measurement Processing

Figure 10:
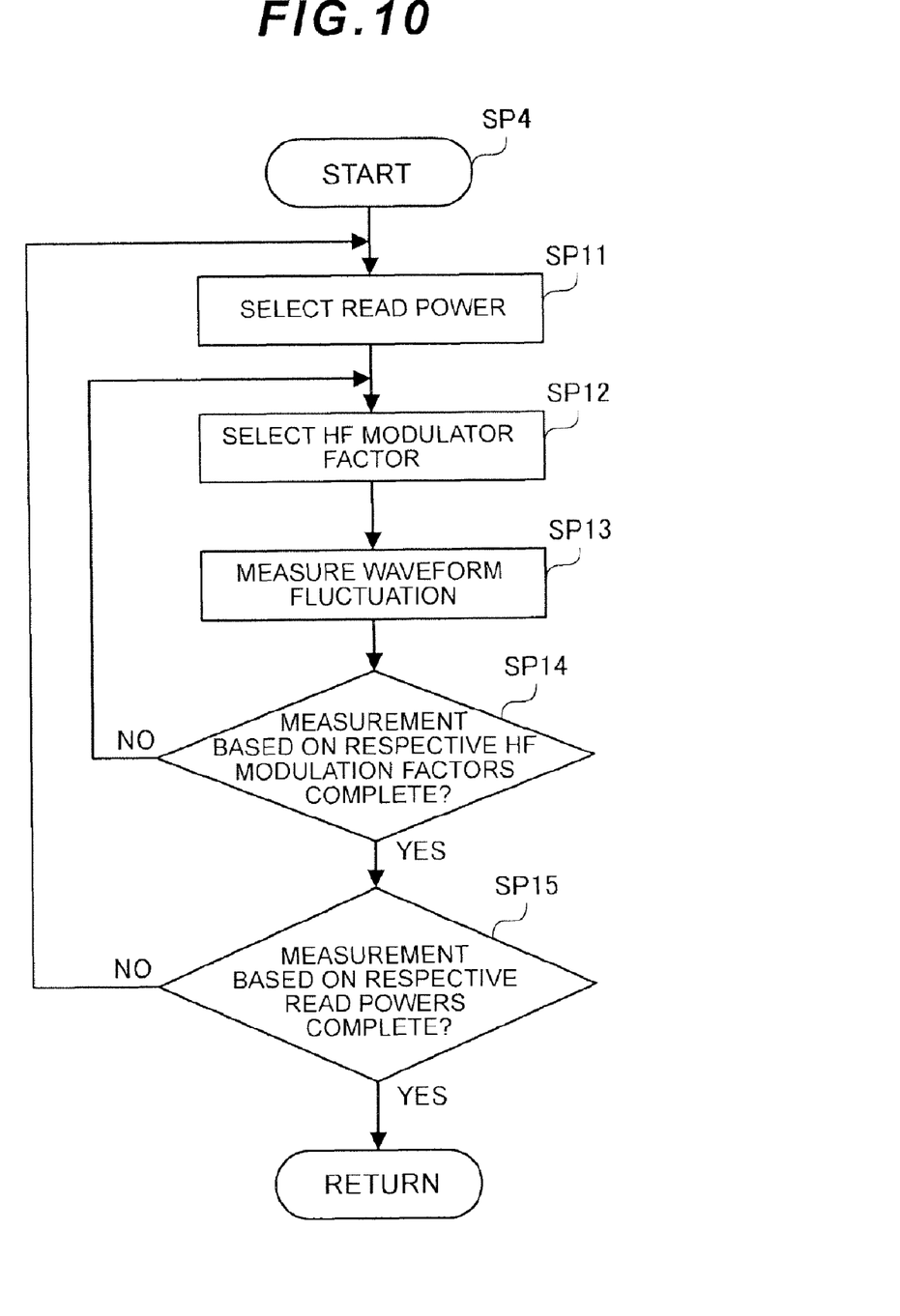
FIG. 10 is a flowchart explaining the waveform fluctuation measurement processing.

Here, the waveform fluctuation measurement processing (SP4) for obtaining the two-dimensional map of the waveform fluctuation in relation to the read power and the HF modulation factor is explained with reference to FIG. 10.

The microcomputer 4 sequentially selects the read power in a predetermined step size from a predetermined range (SP11), sequentially selects the HF modulation factor in a predetermined step size from a predetermined range (SP12), measures the waveform fluctuation of the tracking error signal with the selected read power and HF modulation factor (SP13), and discriminates whether the waveform fluctuation was measured based on the respective HF modulation factors in the predetermined range (SP14). If a negative result is obtained at step SP14, the microcomputer 4 returns to step SP12.

If a positive result is obtained at step SP14, the microcomputer 4 discriminates whether the waveform fluctuation was measured based on the respective read powers in the predetermined range (SP15). If a negative result is obtained at step SP15, the microcomputer 4 returns to step SP11. If a positive result is obtained at step SP15, the microcomputer 4 ends the processing.

As described above, by measuring the waveform fluctuation of the tracking error signal each time the read power or the HF modulation factor is changed a predetermined step size, a two-dimensional map of the waveform fluctuation in relation to the read power and the HF modulation factor can be obtained.

(4-3) Reproduction Performance Measurement Processing

Figure 11:
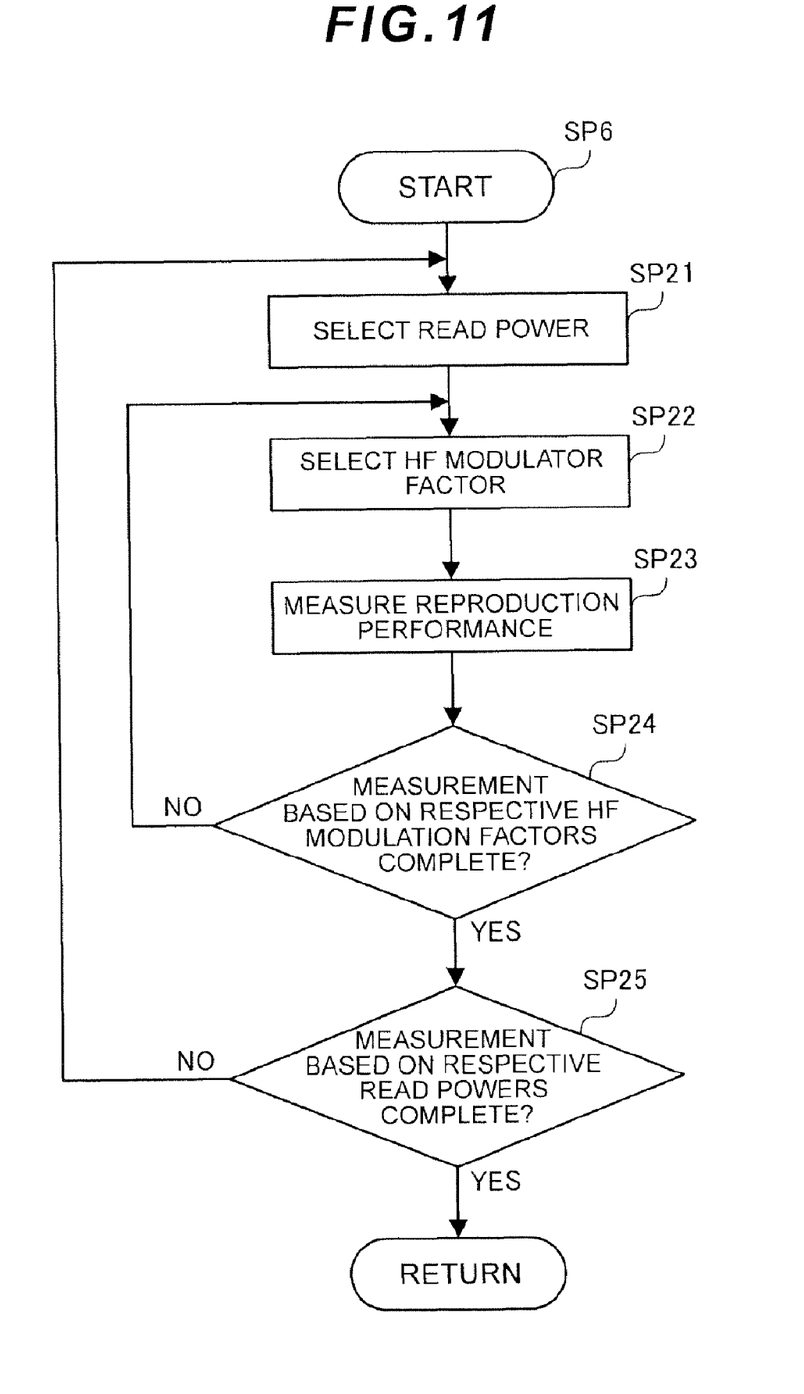
FIG. 11 is a flowchart explaining the reproduction performance measurement processing.

Here, the reproduction performance measurement processing (SP7) for obtaining a two-dimensional map of the reproduction performance in relation to the read power and the HF modulation factor is explained with reference to FIG. 11.

The microcomputer 4 sequentially selects the read power in a predetermined step size from a predetermined range (SP21), sequentially selects the HF modulation factor in a predetermined step size from a predetermined range (SP22), measures the reproduction performance of the reproduction signal with the selected read power and HF modulation factor (SP23), and discriminates whether the reproduction performance was measured based on the respective HF modulation factors in the predetermined range (SP24). If a negative result is obtained at step SP24, the microcomputer 4 returns to step SP22.

If a positive result is obtained at step SP24, the microcomputer 4 discriminates whether the reproduction performance was measured based on the respective read powers in the predetermined range (SP25). If a negative result is obtained at step SP25, the microcomputer 4 returns to step SP21. If a positive result is obtained at step SP25, the microcomputer 4 ends the processing.

As described above, by measuring the reproduction performance of the reproduction signal each time the read power or the HF modulation factor is changed a predetermined step size, a two-dimensional map of the reproduction performance in relation to the read power and the HF modulation factor can be obtained.

(4-4) Reproduction Durability Measurement Processing

Figure 12:
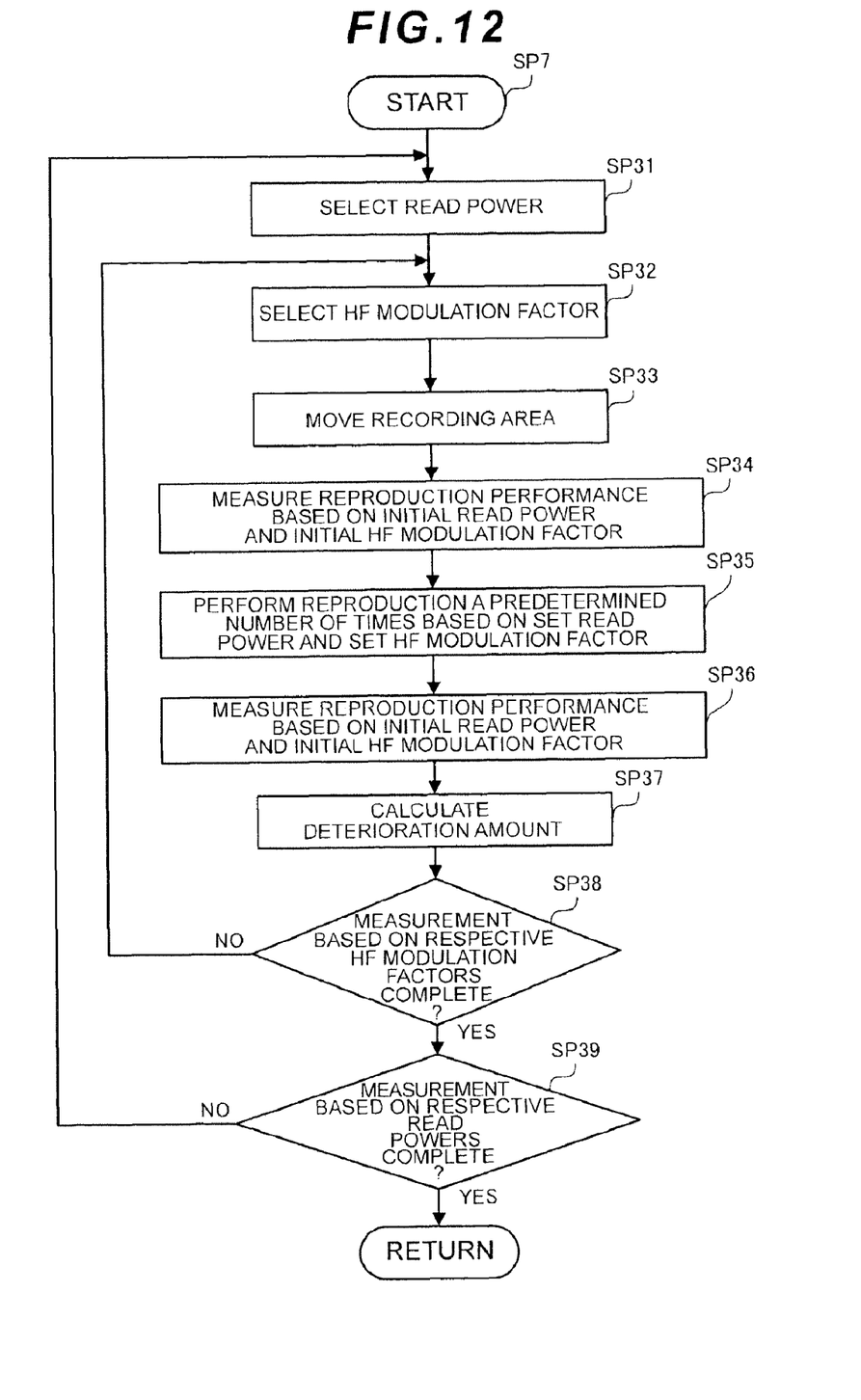
FIG. 12 is a flowchart explaining the reproduction durability measurement processing.

Here, the reproduction durability measurement processing (SP8) for obtaining a two-dimensional map of the reproduction durability in relation to the read power and the HF modulation factor is explained with reference to FIG. 12.

The microcomputer 4 sequentially selects the read power in a predetermined step size from a predetermined range (SP31), sequentially selects the HF modulation factor in a predetermined step size from a predetermined range (SP32), and, for example, with a multilayered disk, increases the read power from the initial read power 0.2 mW at a time until it is increased 1 mW, and increases the HF modulation factor from the initial HF modulation factor 0.5 at a time until it reaches modulation factor 4. This step size is pre-determined for each type of optical disk.

The microcomputer 4 moves the objective lens 38 and moves the focal position of the laser beam to a recording area that is not used in the reproduction durability measurement processing (SP33). Subsequently, the microcomputer 4 measures the reproduction performance with the initial read power and the initial HF modulation factor (SP34). The microcomputer 4 thereafter repeatedly reproduced the same area on the optical disk 2 a predetermined number of times based on the selected read power and HF modulation factor (SP35). A predetermined number of times is, for example, 500 times or a similar number, and may be determined from the time that is available for setup.

The microcomputer 4 once again measures the reproduction performance based on the initial read power and the initial HF modulation factor (SP36), and calculates the deterioration value (reproduction durability) of the reproduction performance that was measured at SP34 and SP36 (SP37). The microcomputer 4 discriminates whether the reproduction performance was measured based on the respective HF modulation factors in the predetermined range (SP38). If a negative result is obtained at step SP38, the microcomputer 4 returns to step SP32.

If a positive result is obtained at step SP38, the microcomputer 4 discriminates whether the reproduction performance was measured based on the respective read powers in the predetermined range (SP39). If a negative result is obtained at step SP39, the microcomputer 4 returns to step SP31. If a positive result is obtained at step SP39, the microcomputer 4 ends the processing.

As described above, by measuring the reproduction durability of the optical disk 2 each time the read power or the HF modulation factor is changed a predetermined step size, a two-dimensional map of the reproduction durability of the optical disk 2 in relation to the read power and the HF modulation factor can be obtained.

Accordingly, the optical disk device 1 of this embodiment is able to inhibit the waveform fluctuation by dynamically changing the read power and the HF modulation factor according to the optical disk 2, and obtain favorable reproduction performance while ensuring reproduction durability.

(5) Other Embodiments

Although the foregoing embodiment used a TE signal for measuring the waveform fluctuation, a reproduction signal may also be used. In the foregoing case, the waveform fluctuation may be measured simultaneously upon measuring the reproduction performance of the reproduction signal.

Moreover, although the foregoing embodiment used a reproduction signal as the index of the reproduction performance, a wobble signal may also be used.

Moreover, although the foregoing embodiment measured the waveform fluctuation and the like for each HF modulation factor of a predetermined step size and for each read power of a predetermined step size, the waveform fluctuation and the like may also be measured by setting either the HF modulation factor or the read power as a fixed value, and only changing the other for each predetermined step size.

Moreover, although the foregoing embodiment measured the waveform fluctuation and the like for each HF modulation factor, the waveform fluctuation and the like may also be measured for each amplitude of a high frequency superimposed current, or the waveform fluctuation and the like may also be measured for each HF frequency.

Moreover, although the foregoing embodiment measured the waveform fluctuation, the reproduction performance, and the reproduction durability, only one or two among the above may be measured. In the foregoing case, the index that is not measured may be measured beforehand upon designing the optical disk device.

Moreover, although the foregoing embodiment determined the HF modulation factor and the read power upon loading the optical disk, if reproduction is to be performed with a plurality of reproduction speeds according to the radius of the optical disk or the like, the HF modulation factor and the read power may be determined each time the reproduction speed is changed. This is because, if the reproduction performance or the reproduction durability will change depending on the reproduction speed, the optimal read power and HF modulation factor will differ.

Moreover, when reproducing a multilayered disk, the HF modulation factor and the read power may be determined each time the recording layer to be reproduced is changed. This is because, if the waveform fluctuation, the reproduction performance, and the reproduction durability differ depending on the recording layer, the optimal read power and HF modulation factor will differ.

Moreover, upon measuring the reproduction durability, since it may deteriorate the recorded data, an area such as the OPC area, which is free from the problem of deterioration data, may also be measured.

Moreover, operations such as tilt and focus adjustment with low dependency on the read power and the HF conditions may be performed before the determination processing of the read power and the HF modulation factor. In the foregoing case, adjustment may be performed by using the initial read power and the initial HF modulation factor. Operations such as gain adjustment that depend on the read power should be performed before and after the adjustment of the read power and the HF conditions.

Moreover, although the foregoing embodiment applied an optical disk 2 recorded with information, upon applying an optical disk 2 without information recorded thereon, it is necessary to record information on the optical disk 2 prior to adjusting the read power and the HF modulation factor.

Figure 13:
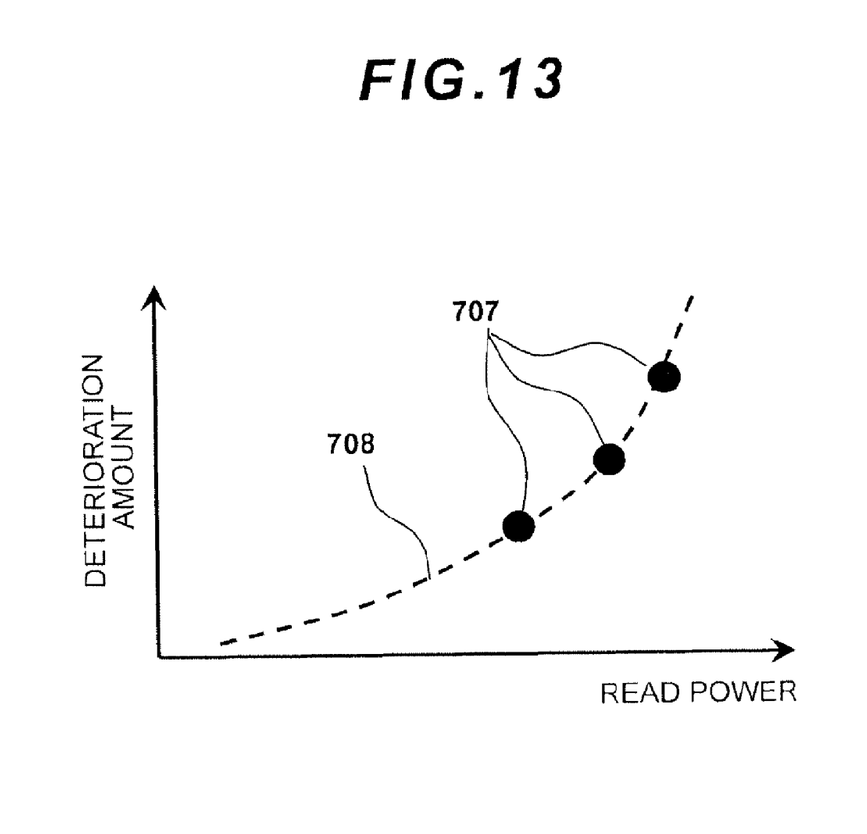
FIG. 13 is a diagram explaining a method of measuring the reproduction durability according to another embodiment.

Moreover, although the foregoing embodiment sequentially measured the deterioration value of the reproduction performance for each read power in a predetermined step size upon measuring the reproduction durability, since there are cases where measurement is difficult in an area with low read power since the deterioration value is small, as shown in FIG. 13, the deterioration value may be estimated based on fitting. In the example shown in FIG. 13, fitting can be performed based on the measurement point 707 to calculate the approximate line 708, and the deterioration value in a low read power can be estimated.

Moreover, although the foregoing embodiment separated and mounted the laser diode 31 and the power monitor 34 on the optical pickup 3, and the power monitor may be packaged, and the laser diode for outputting the detected power to the microcomputer 101 may be mounted on the optical pickup. In the foregoing case, space-saving can be realized, and control can be facilitated. Moreover, two or more blocks among the microcomputer 101, the laser driver 102, the analog signal processor 111, and the digital signal processor 112 may be integrated into a single block.

The present invention can be applied to optical disk devices compliant with the BD specification, DVD specification, CD specification and other specifications.

What is claimed is:

1. An optical disk device which reflects a laser beam emitted from a laser beam source off an optical disk, detects the reflected light as an electric signal with a photodetector, the optical disk device comprising:

an analog signal processor for generating a servo signal and a reproduction signal from the detected electric signal;

a digital signal processor for sampling the generated servo signal and reproduction signal;

a laser driver for superimposing a high frequency current on a direct current to obtain a drive current and supplying the drive current to the laser beam source, and driving the laser beam source; and a control unit for obtaining the servo signal and reproduction signal sampled by the digital signal processor and setting a current value of the direct current and/or the high frequency superimposed current supplied by the laser driver to the laser beam source, wherein the control unit is configured to:

obtain a relation of a value representing a waveform fluctuation of the servo signal or the reproduction signal and the current value of the direct current and/or the high frequency superimposed current, a relation of a value representing a reproduction performance of the reproduction signal and the current value of the direct current and/or the high frequency superimposed current, and a relation of a value representing a durability performance of the optical disk in relation to the laser beam and the current value of the direct current and/or the high frequency superimposed current; and determine the current value of the direct current and/or the high frequency superimposed current so that the current value of the direct current and/or the high frequency superimposed current satisfies specified values of the waveform fluctuation, the reproduction performance, and the durability performance.

2. The optical disk device according to claim 1, wherein the servo signal is a tracking error signal when a tracking servo control is not performed, and the control unit is configured to:

detect a local maximum value and a local minimum value of a waveform of the tacking error signal;

measure a variation of the local maximum value and the local minimum value or a variation of the center of amplitude, as a value representing the waveform fluctuation of the tracking error signal; and determine the current value of the direct current and/or the high frequency superimposed current so that the measured value satisfies its specified value before the tracking servo control is started or after the tracking servo control is stopped.

3. The optical disk device according to claim 1, wherein the control unit is configured to:

measure at least one among a jitter, an error rate and an amplitude of the reproduction signal, as the value representing the reproduction performance of the reproduction signal; and determine the current value of the direct current and/or the high frequency superimposed current so that the measured value satisfies its specified value regarding the reproduction performance of the production signal.

4. The optical disk device according to claim 1, wherein the control unit is configured to:

measure a variation of at least one among a jitter, an error rate and an amplitude of the reproduction signal after the optical disk is reproduced a predetermined number of times, as the value representing the durability performance of the optical disk in relation to the laser beam; and determine the current value of the direct current and/or the high frequency superimposed current so that the measured value satisfies its specified value regarding the durability performance of the optical disk.

5. The optical disk device according to claim 1, wherein the control unit is configured to:

respectively change an average value of the drive current and a drive current modulation factor as a ratio of the average power and a peak power of the drive current, and, for each change, measure the value representing the waveform fluctuation of the servo signal or the reproduction signal, the value representing the reproduction performance of the reproduction signal, or the value representing the durability performance of the optical disk in relation to the laser beam;

specify a range of the average power and the drive current modulation factor so that the value representing the waveform fluctuation satisfies its specified value, the value representing the reproduction performance satisfies its specified value, and the value representing the durability performance of the optical disk in relation to the laser beam satisfies its specified value; and determine the current value of the direct current and/or the high frequency superimposed current so that it becomes the average power and the drive current modulation factor within the specified range.

6. The optical disk device according to claim 1, wherein the control unit is configured to determine the current value of the direct current and/or the high frequency superimposed current so that the current value of the drive current becomes smallest.

7. The optical disk device according to claim 1, wherein the control unit is configured to stop performing reproduction if there are no conditions in which the value representing the waveform fluctuation of the servo signal or the reproduction signal satisfies the specified value of the waveform fluctuation, the value representing the production performance of the reproduction signal satisfies the specified value of the reproduction performance, and the value representing the durability of the optical disk in relation to the laser beam satisfies the specified value of the durability performance.

8. The optical disk device according to claim 1, wherein the control unit is configured to determine the direct current value and/or the high frequency superimposed current value each time a speed for reproducing the optical disk is changed.

9. The optical disk device according to claim 1, wherein the control unit is configured to determine the direct current value and/or the high frequency superimposed current value each time a recording layer on the reproduced optical disk is changed.

* * * * *